Dec. 1, 1970  J. L. PRESS  3,543,418
INTELLIGENCE TESTING DEVICE
Filed Jan. 10, 1969  4 Sheets-Sheet 1
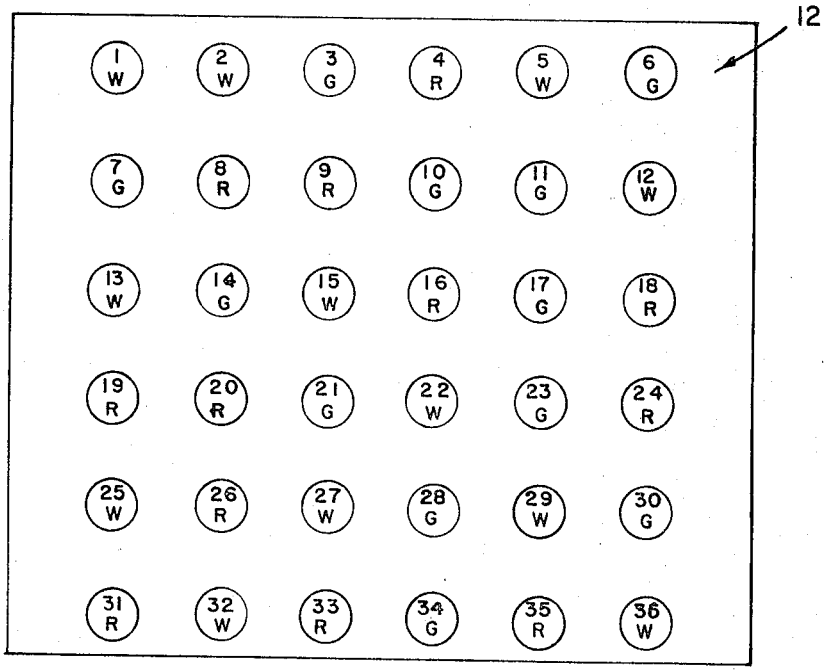
FIG. 1.
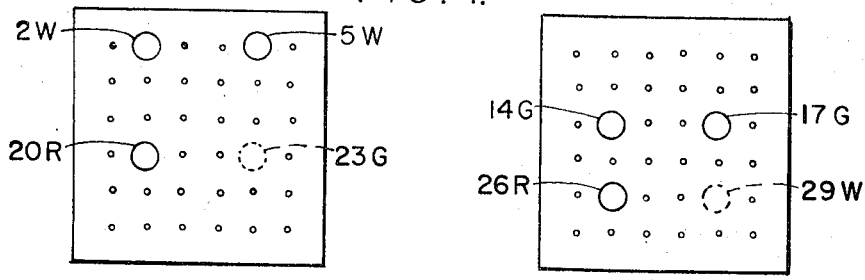
FIG. 2A  FIG. 2B
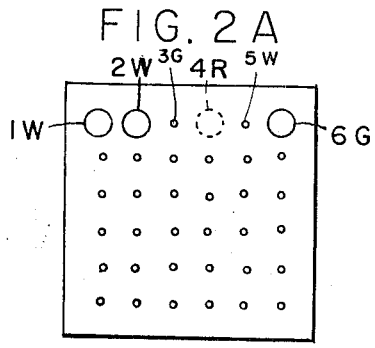 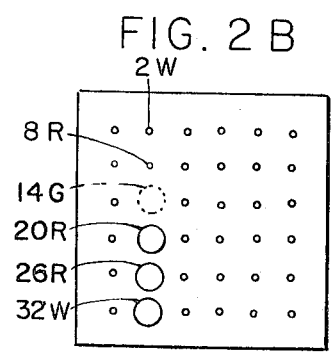
FIG. 3A  FIG. 3B
INVENTOR.
JAY L. PRESS
BY Friedman & Goodman
Attorneys Dec. 1, 1970　　　　　　　J. L. PRESS　　　　　　3,543,418
INTELLIGENCE TESTING DEVICE
Filed Jan. 10, 1969　　　　　　　　　　　　4 Sheets-Sheet 2

INVENTOR.
JAY L. PRESS
BY Friedman & Goodman,
Attorneys

Dec. 1, 1970    J. L. PRESS    3,543,418
INTELLIGENCE TESTING DEVICE
Filed Jan. 10, 1969    4 Sheets-Sheet 3

INVENTOR.
JAY L. PRESS
BY
*Friedman & Goodman*
Attorneys

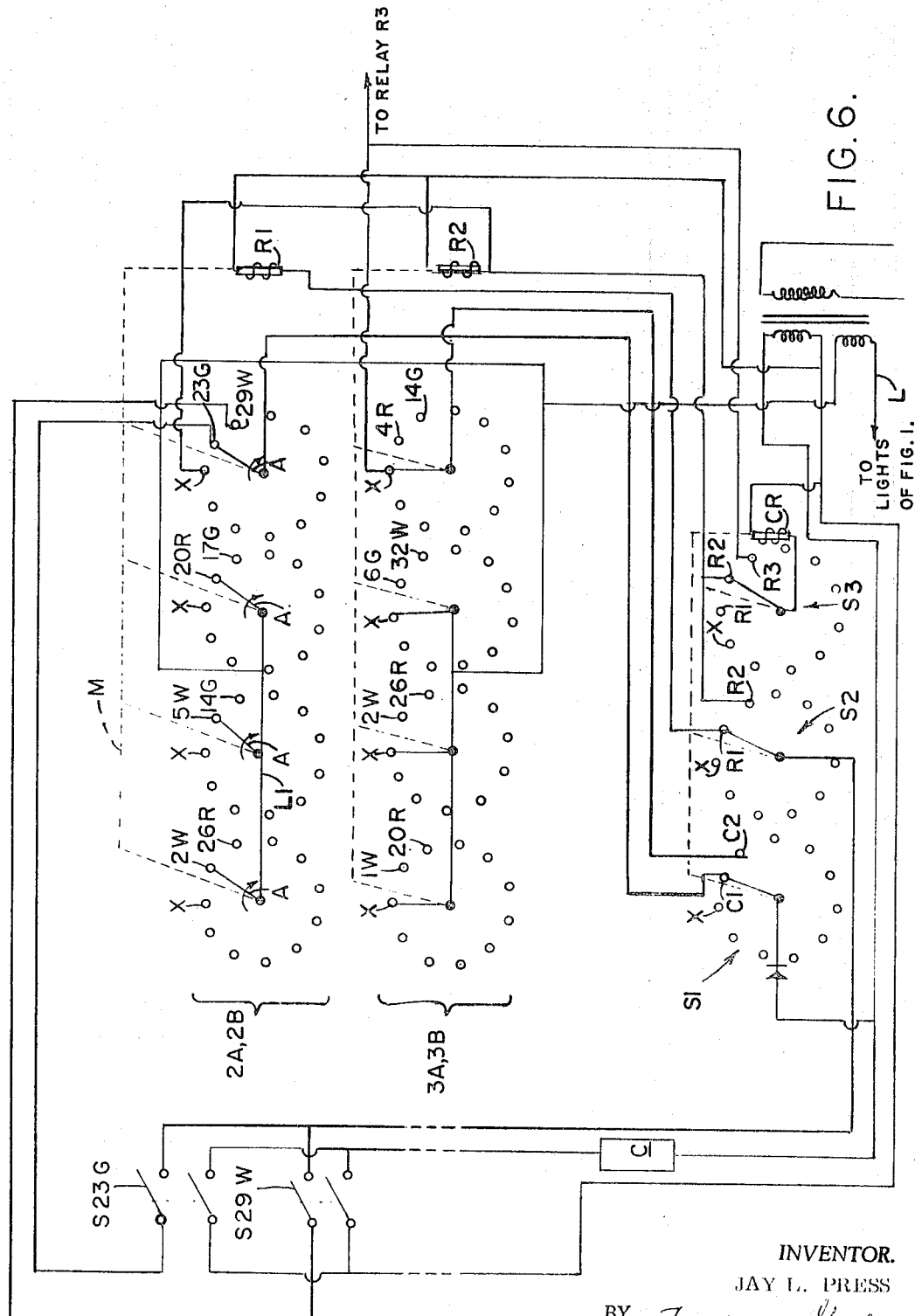

United States Patent Office 3,543,418
Patented Dec. 1, 1970

3,543,418
INTELLIGENCE TESTING DEVICE
Jay L. Press, BOQ, Whidbey Island,
Oak Harbor, Wash. 98277
Filed Jan. 10, 1969, Ser. No. 790,346
Int. Cl. G09b 5/00
U.S. Cl. 35—22    8 Claims

ABSTRACT OF THE DISCLOSURE

An intelligence testing device employing an array of lights which during a first interval of operation presents a partially completed visual display formed by the array of lights to a subject who, in response thereto, is required in a second interval of operation to select an additional light to illuminate to complete the visual display. The number of selections made by the subject until the proper completion of the visual display has significant value as an indication of the intelligence of the subject being tested.

---

The present invention relates generally to intelligence and psychological testing programs and procedures, and more particularly to improvements in a device as well as in a method for conducting intelligence tests.

As generally understood, it is common practice as part of employment placement practices as well as for numerous other purposes, such as for example to detect brain damage and defects, to seek to determine the intelligence of the employee or subject by use of one or more testing devices or testing procedures. In response to this need, there are now available numerous testing devices which, although generally satisfactory, do not embody all necessary requirements. Specifically, the known available testing devices are characteristically restricted in the type of test procedures which they follow and this, in turn, restricts these devices in the nature of the useful information which they produce. Attempts to increase the range of tests that can be administered by these known testing devices have invariably resulted in more complicated construction and mode of operation of these testing devices with its attendant disadvantages.

Broadly, it is an object of the present invention to provide an intelligence testing device and a procedure for testing intelligence overcoming the foregoing and other shortcomings of the prior art. Specifically, it is an object to provide a testing device which operates in successive first and second intervals of operation, the first interval of operation being programmed to present an almost limitless range of partially completed visual displays to the subject being tested, which the subject in response thereto is required during the second interval of operation to properly complete. Thus, the mode of operation of the testing device hereof contemplates an active participation on the part of the subject being tested in response to a wide range of visual stimuli, all as will be described in greater detail subsequently herein.

A testing device demonstrating objects and advantages of the present invention includes an array of lights of selected colors arranged in rows defining a square, light-illuminating means for selectively illuminating, during a first interval of operation, certain numbers of these lights so as to form a partially completed visual display such as, for example, a geometric shape. The subject, in response thereto, is required during the second interval of operation of the device, or what can aptly be termed the second part of the test, to recognize this geometric shape and to complete the visual display by selecting the additional light which achieves this result. The test procedure or concept can also require recognition by the subject of the cooperating significance of the different colors of the lights as well as of a geometric shape, or a combination of a cooperating significance between the lights based on color as well as on geometric shape, all to the end of enabling a great many testing concepts to be presented and used in the testing of the subject.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a diagrammatic view of an exemplary array of lights used to form a visual display in accordance with the present invention;

FIGS. 2, 3 and 4 followed by capital letters similarly are diagrammatic views of the display panel of lights of FIG. 1 but in which, for clarity's sake, only those lights which form certain predetermined visual displays are illustrated. Specifically, FIGS. 2A and 2B each illustrate a first concept of a visual display in which the lights illuminated in a first interval of operation of the device are illustrated in full line perspective and the remaining light which completes the display and which is illuminated during a second interval of operation is illustrated in phantom perspective;

FIGS. 3A and 3B are similar to the just-described FIGS. 2A and 2B but illustrate a second concept for a visual display according to the present invention;

FIG. 6 is an exemplary circuit diagram of the electrical controls for operating the light display panel to produce the various visual displays of FIGS. 2A, 2B, 3A, 3B and such other visual displays as are exemplified by the displays of FIGS. 4A–4H.

Figure 5:
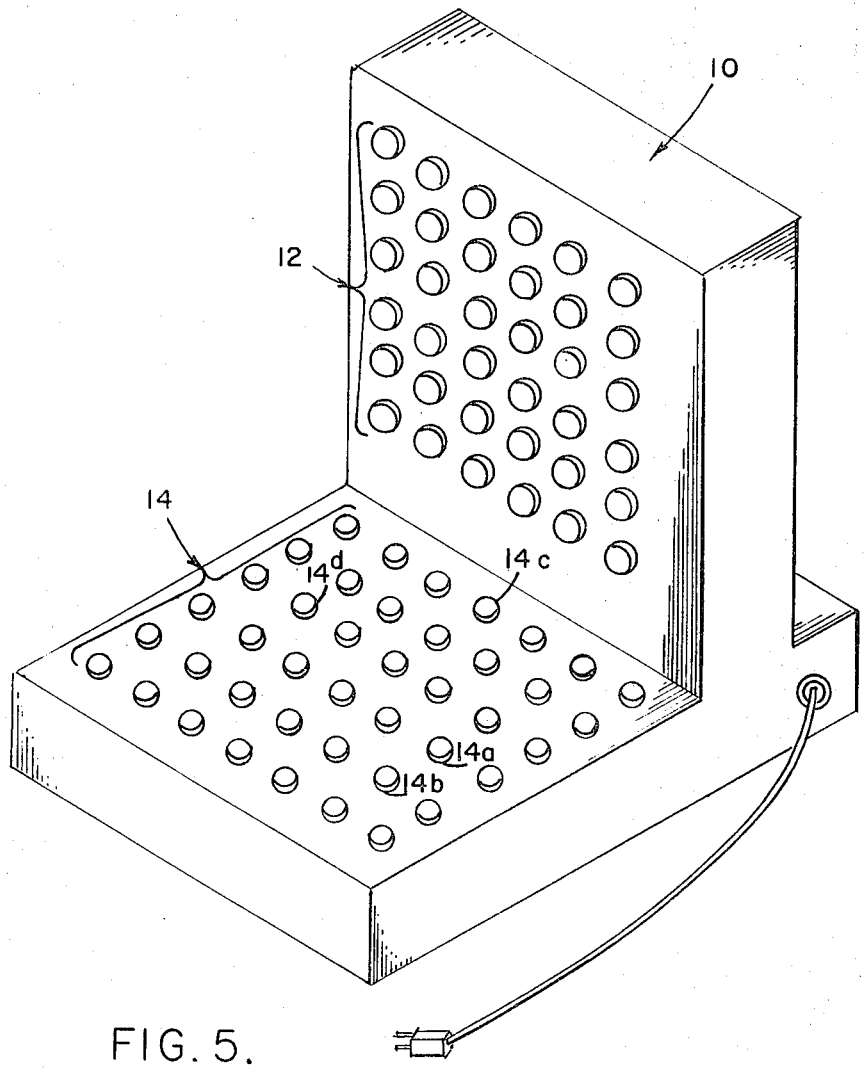
FIG. 5 is a perspective view of a typical device which embodies the light display panel or array of FIG. 1.

Reference is now made to the drawings and in particular to FIG. 5 in which there is diagrammatically illustrated an intelligence testing machine or device, generally designated 10, having an array of lights, generally designated 12, and diagrammatically illustrated in FIG. 1, which is used in practice to form visual displays for testing the intelligence of a subject observing these displays. Still referring to FIG. 5, the array of lights 12 will be understood to be of the type in which the individual lights thereof are illuminated when the subject being tested actuates an appropriate one of the buttons, herein individually and collectively designated 14, which is associated with each light. In this respect, except as is noted herein, the construction of the device 10 may take any one of numerous forms and the particular form selected is not an essential part of the present invention; what is an essential part of the present invention is the mode of operation of the device 10.

To better understand this noteworthy operation of the device 10, reference should first be made to the diagrammatic illustration of the array of lights 12 provided in FIG. 1. This array of lights consists of 36 individual lights arranged in rows defining a square wherein each row contains six lights. Additionally, the array 12 includes several different colors, three such colors being used in the illustrated embodiment of FIG. 1 and consisting of white, green and red. To illustrate this, the individual lights have been consecutively numbered 1 through 36 and the color thereof indicated by the capital letter W, G or R, which respectively are intended to represent the colors white, green and red. The significance of the different colors of light and the arrangement thereof in rows defining a square, all as is illustrated in FIG. 1, is that it permits operating the device 10 to produce different visual displays in first and second successive intervals of operation using variations of color, or cooperating locations of lights, or combinations of these two aspects, all as will now be described in detail.

FIGS. 2A and 2B are intended to illustrate two different forms of visual displays having the same underlying test concept or basis. For clarity's sake, only the lights of the array 12 which form such visual displays are illustrated. Moreover, of the illustrated lights, those which are illuminated during a first interval of operation of the device 10 are illustrated in full line whereas the remaining single light which is illuminated during the second interval of operation of the device is illustrated in phantom perspective. Specially, as illustrated in FIG. 2A, the operation of the device 10 in accordance with the present invention is such that the device 10 is automatically programmed, all as will be described in greater detail subsequently, to initially illuminate during a first interval of operation the three lights specifically designated 2W, 5W and 20R. Thus, these three lights are presented to the subject whose intelligence is being tested in a partially completed visual display. The subject is then required, based on his analysis of this partially completed display, to recognize that completion thereof requires illumination of light 23G which completes the formation of a rectangle, the completion of this geometrical shape being understood to be the correct answer or solution to the test concept exemplified in FIG. 2A. FIG. 2B illustrates but another form of a partial visual display of a rectangle in the form of illuminated lights 26R, 14G and 17G which, the subject, in a correct response thereto, is required to illuminate remaining light 29W. In connection with the foregoing, the illumination of lights 23G and 29W is achieved by the subject respectively actuating the buttons 14a and 14b in the arrangement of buttons 14, these buttons 14a and 14b occupying the same position within the array of buttons 14 that the lights 23G and 29W occupy in the array of lights 12 and thereby enabling the subject to make the necessary cooperating association between the buttons and lights.

Reference is now made to FIGS. 3A and 3B illustrating a second possible testing concept or basis. Specifically, as distinguished from the partial presentation of a geometrical shape as exemplified by the test concept of FIGS. 2A and 2B, the concept of FIGS. 3A and 3B are solved by a recognition of a relationship of the colors of the various illuminated lights forming the initial partially complete visual display. For example, as illustrted in FIG. 3A, the partial visual display which is presented to the subject during the first interval of operation of the device 10 consists of the illumination of the lights 1W, 2W and 6G. This leaves the three remaining lights 3G, 4R and 5W unlit in the upper horizontal row of lights. The subject, in order to provide a proper response and solution to the test concept of FIG. 3A, is required to illuminate light 4R of these three remaining lights since this is the only light which will result in the illumination of all three colors in the row, it being understood that this three-color illumination is the predetermined correct solution to this test. Similarly, and as clearly illustrated in FIG. 3B, the same test concept but in another form is presented to the subject in the illumination, during the first interval of operation, of the lights 32W, 26R and 20R, thereby leaving unlit in the second vertical row the lights 14G, 8R and 2W. As should be readily surmised, the proper solution or answer to the test pattern of FIG. 3B thus requires the selection of light 14G for illumination rather than the other two remaining lights in this row in order to produce the illumination of all three colors of lights in the second vertical row. Here again, and as illustrated in FIG. 5, to repsectively illuminate the lights 4R and 14G, it is necessary that the subject actuate the buttons 14c and 14d which occupy the same relative positions in the array of buttons 14 that the lights 4R and 14G occupy in the array of lights 12.

Figure 4:
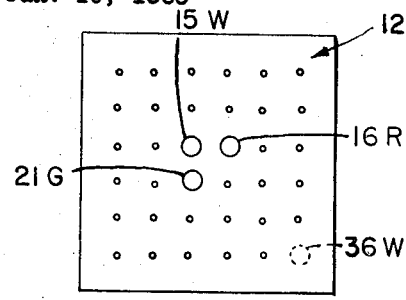
FIGS. 4A–4H are similar to FIG. 2A, but each of these figures illustrate a different concept for a visual display according to the present invention.
Figure 4:
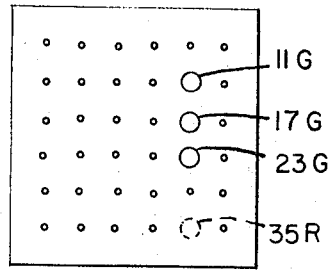
Figure 4:
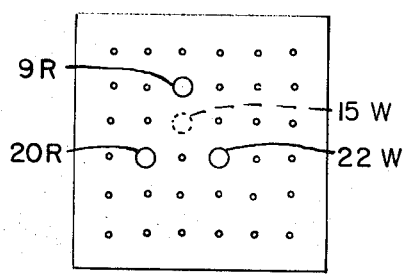
Figure 4:
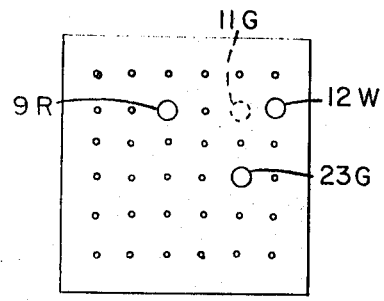
Figure 4:
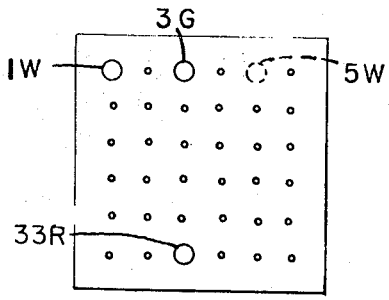
Figure 4:
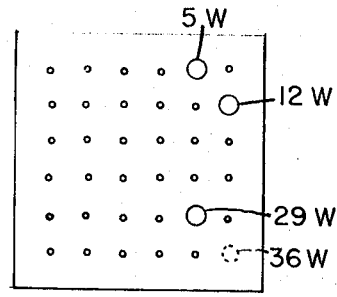
Figure 4:
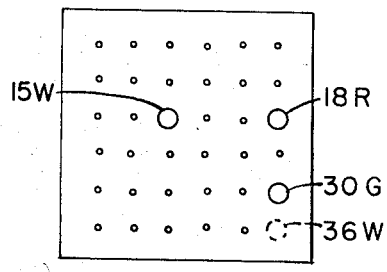
Figure 4:
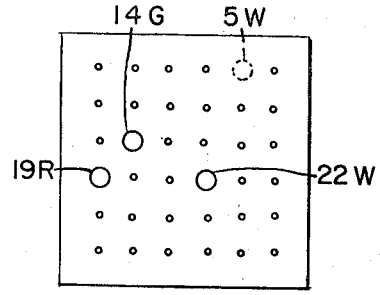

Brief reference will now be made to FIGS. 4A–H which illustrate additional test concepts which are intended to underlie the mode of operation of the device 10. In FIG. 4A, the complete visual display is intended to be the head of an arrow and the intersection of the shaft of such arrow with one of the bordering rows of the array of lights 12. Thus, the initial or partial visual display presented to the subject during the first interval of operation is the illumination of lights 21G, 15W and 16R and the correct solution requires the illumination of the fourth light 36W. As in the case of the other test concepts, the test concept of FIG. 4A may also be embodied in other forms of partial visual displays.

In FIG. 4B, the correct response consists of the illumination of the minority color of the unlit lights in the row having the three initial lit lights. As illustrated, the partial visual display thus consists of the illumination of lights 11G, 17G and 23G and the correct response or answer calls for the illumination of light 35R.

In FIG. 4C, the test concept calls for the recognition that an isosceles triangle is formed by the partial visual display presented during the first interval operation of the device 10 and the correct response thereto is the illumination of the light under the vertex of this triangle. Thus, the initial or partial visual display consists of the illumination of the lights 20R, 9R and 22W to be followed during the second interval of operation of the device 10 by the illumination of the light 15W.

The test concept illustrated by FIG. 4D is one in which the subject must recognize that the initially illuminated red and white lights define an imaginary line and the correct response is the illumination of the green light which lies on an imaginary line making a perpendicular with this red-white line. Thus, the partial visual display consists of the illumination of the lights 9R, 12W and 23G and the answer to this test pattern or concept thereof requires the illumination of the light 11G.

In FIG. 4E, the subject must recognize that an imaginary axis line is formed between the red and green lights which are illuminated, namely, lights 3G and 33R and that the correct answer consists of rotating the illuminated white light 1W about this axis line to the corresponding position on the other side thereof and thus calls for the illumination of the corresponding light 5W.

In FIG. 4F, the subject must recognize that the correct solution consists of the illumination of all lights of the same color in two parallel rows or lines. Thus, in an acceptable specific form of visual display exemplifying this test concept as illustrated in FIG. 4F a first partial visual display consists of the illumination of the lights 5W, 12W and 29W and the correct answer or solution thereto is the illumination of light 36W.

In FIG. 4G, the test concept which must be recognized by the subject is that the imaginary line drawn between the illuminated red light 18R and green light 30G defines a line of movement from red to green and the correct solution requires the illumination of the light occupying the position where this line of movement intersects a boundary of the array of lights 12 which, in the specific illustrated example, consists of the light 36W. In this instance, the illuminated light 15W is extraneous and, as part of the solution to the problem, the subject must be capable of disregarding this light in arriving at the proper solution.

In the final test concept which is illustrated herein in FIG. 4H, the subject must recognize from the partial visual display which is presented in the form of the illuminated lights 19R, 14G and 22W, that if horizontal, vertical and diagonal lines are drawn through these illuminated lights that there is only one white light, namely light 5W, which does not fall on any of these imaginary lines.

From the foregoing, it should be readily appreciated that a great variety of test concepts can underlie the mode of operation of the device 10 including, for example, the ten concepts herein specifically discussed, and that furthermore each of these concepts, in turn, can be represented by a great variety of partial and completed visual displays during respective first and second intervals of operation of the device 10. Still further, these test concepts obviously are of varying degrees of complexity and, in accordance with the present invention, it is contemplated that the subject being tested will not provide the proper or correct solution on the first try but that numerous attempts at finding the correct solution will be necessary. In this regard, the correct solution will be indicated to the subject when the fourth light completing the display is illuminated, all other solutions which are not correct being ineffective to cause this result. Moreover, the number of attempts made by the subject is recorded and this recorded number has been found to have a high correlation to the degree of intelligence of the subject being tested.

Reference is now made to FIG. 6 wherein there is shown an exemplary circuit diagram for achieving the mode of operation of the device 10 in accordance with the operation thereof which has just been described and which presents the test concepts of FIGS. 2A, 2B and 3A and 3B, it being understood that the circuitry for providing the remaining test concepts entails merely duplicating portions of the illustrated circuitry. The circuitry of FIG. 6 includes an upper horizontal arrangement of four conventional stepping switches, herein individually and collectively designated 2A, 2B, which designation will be understood to identify these stepping switches as providing the mode of operation of the device 10 to produce the test concept exemplified by FIGS. 2A, 2B. Assuming that this test concept will be presented to the subject in ten different forms, each stepping switch of the row of stepping switches 2A, 2B has a single ground contact X and ten active contacts circumferentially spaced about the switch contact arm A which are correlated to the lights which produce the underlying test concept of FIGS. 2A, 2B. In FIG. 6, only the two active contacts first encountered by the contact arm A during stepping operation have been identified, the identification thereof being correlated to the identification of the lights which are illuminated to make the visual display presentations of the test concept. In other words, the first encountered contact of the three stepping switches of the horizontal line 2A, 2B, starting with the stepping switch to the extreme left as viewed in FIG. 6, respectively consists of the contacts 2W, 5W and 20R, each of which will be understood to result in the illumination of the lights 2W, 5W and 20R when the contact arms A are in electrical contact with these contacts. This can be confirmed by tracing the completed circuit including the conductor L (see lower right hand corner of FIG. 6) which is connected to the array of lights 12 of FIG. 1 and also to a common conductor L1 connecting the center contacts of all the contact arms A. Thus, each of the contact arms A in the positions illustrated in FIG. 6 will be understood to complete a circuit which, in a well understood manner, results in the illumination of the three lights of the partial visual display, namely, the lights 2W, 5W and 20R. The fourth remaining light as is necessary to complete the test concept of FIG. 2A is light 23G and, for this light to be illuminated, it is necessary that the subject being tested close the switch S23G shown to the left of FIG. 6. Assuming, however, that the subject does not immediately recognize the test concept and instead closes switch S29W, the closing of this switch merely results in a pulse being supplied to the counter C, which will be understood to be of conventional construction and capable of recording the number of impulses supplied thereto. That is, the closing of switch S29W will not result in the illumination of the fourth light but rather in the recording of a wrong selection by the subject. The subject must therefore continue to make additional selections of the light which he believes completes the partial visual display until he selects the correct light by closing the switch S23G which illuminates this light. When this occurs, the circuit is completed which energizes the coil of relay R1 (shown to the right of the horizontal row of stepping switches 2A, 2B) and this, in turn, results in the stepping of the contact arms A from the first encountered contact to the second encountered contact illustrated in FIG. 6, namely contacts 26R, 14G, 17G and 29W. By reference to FIG. 2B, it will be recognized that these contacts are identified by the same reference numerals and letters used to identify the lights which provide the partial and completed visual displays which are examplary of the test concept of FIG. 2B.

The achievement of the foregoing results from the mechanical connection, illustrated diagrammatically by the dash reference lime M, of the contact arms A to the relay R1 and the well understood manner of operation of the relay R1 to advance the contact arms A to the second encountered contacts 26R, 14G, 17G and 29W. This, in turn, results in illumination of lights 26R, 14G and 17G which provide the partial visual display in the first interval of operation of the device 10 which, during the second interval of operation, requires the illumination of the light 29W to correctly complete the visual display. This correct completion is achieved, of course, when the subject closes the switch S29W which then completes the circuit resulting in the illumination of the light 29W. In this manner, all ten forms of presenting the test concept of a partially complete rectangle are presented by successive movement of the contact arms A through the ten active contacts circumferentially spaced about the circumferential paths of movement of the contact arms A. Ultimately, successive switch operation actuates the contact arms A completely through clockwise movement into electrical contact with the contact X. When this occurs, appropriate circuits are completed which are effective, in a well understood manner, to render relay R1 and the horizontal row of stepping switches 2A, 2B operationally ineffective and make relay R2 and the horizontal row of stepping switches 3A, 3B operationally effective in their stead. Although not shown, it will be understood that there is electrically connected in parallel to the switches S23G, S29W, all of the switches necessary to illuminate each of the lights of the light array 12, including the switches necessary to illuminate the lights 4R and 14G which are necessary to respectively complete the partial displays of FIGS. 3A, 3B. Since the manner in which this is achieved is similar to the mode of operation already described in connection with the test concept of FIGS. 2A, 2B, for brevity's sake this mode of operation will not be repeated.

Reference should now be made to the control portion of the circuit of FIG. 6 which operates, in a well understood manner, to program for presentation a range of test concepts such as, for example, the ten different concepts which have been specifically described herein and which further causes a change in test concept only after the presentation of a range of forms of these various concepts, which number again is selected for purposes of illustration herein to be ten. Any one of several specific embodiments of circuitry can be used to achieve this function, and thus the specific embodiment illustrated herein is to be understood not to be an essential part of the present invention nor is a detailed description thereof necessary for an understanding of the present invention. Thus, the description of this control portion of the circuit of FIG. 6 which follows is greatly simplified.

Arranged in a horizontal row along the bottom of FIG. 6 are three stepping switches S1, S2 and S3 all controlled by the control relay CR. These stepping switches program the test concepts such that the device 10 presents each of the ten forms of each test concept and then proceeds to the next test concept. To illustrate this mode of operation, let it be assumed that the last specific form of the first concept provided by the stepping switch row 2A, 2B is successfully responded to and that this correct response, i.e. closing of the proper switch, causes stepping of all contact arms A to each contact X, all as already explained. Tracing the circuit of FIG. 6, the electrical contact of contact arm A of the right hand switch of row 2A, 2B with contact X completes a circuit through stepping switch S3 for the coil of control relay CR causing operation of this relay. This operation, in turn, causes stepping of the contact arm of switch S1 from contact C1 to C2, the contact arm of switch S2 from contact R1 to R2, and finally the contact arm of switch S3 from contact R2 to R3. In a well understood manner, which again can readily be confirmed by tracing the circuit of FIG. 6, the just noted contact arm movement replaces the first test concept C1 and its associated relay R1 with the second test concept C2 and its associated relay R2.

A latitude of modification, change and substitution is intended in the foregoing disclosure and in some instances some features of the invention will be employed without a corresponding use of other features.

What is claimed is:

1. An intelligence testing device comprising a prescribed array of lights of selected colors adapted to present a visual display to a subject being tested, light-illuminating means for causing selective illumination of said lights in a predetermined display pattern in first and second successive intervals of operation, a first control means operatively connected to said light-illuminating means so as to cause the illumination of only a prescribed portion of said predetermined display pattern during said first interval of operation, second control means adapted to be operated by said subject operatively connected to said light-illuminating means so as to selectively cause the illumination of those remaining lights necessary to complete said predetermined display pattern during said second interval of operation, and recording means for recording the number of instances the subject operates such second control means while attempting to make said completion of said predetermined design pattern until said completion is achieved, whereby said recorded member is useful as an indication of the intelligence of said subject.

2. An intelligence testing device as defined in claim 1 wherein the number of illuminated lights forming said prescribed portion of said predetermined display pattern displayed during said first interval of operation is a substantial member of the total number of lights forming said completed display pattern, whereby said prescribed portion of said display pattern is of a sufficient extent to suggest said completed display pattern.

3. An intelligence testing device as defined in claim 2 wherein each said completed display pattern comprises four illuminated lights in selected cooperating locations and colors.

4. An intelligence testing device as defined in claim 1 wherein said array of lights consists of white, red and green lights arranged in rows defining a square and wherein each row thereof consists of six lights.

5. A method of testing the intelligence of a subject employing a prescribed array of lights of selected colors adapted to present a visual display to said subject comprising the steps of illuminating a selected member of said lights to form a prescribed partial visual display of a proposed complete visual display, selecting, at the direction of the subject being tested, the illumination of additional lights as are necessary to provide said complete visual display, and recording the number of said selections by the subject to thereby provide a member having a correlation to the intelligence of the subject.

6. A method of testing as defined in claim 5 wherein said prescribed array of lights consists of white, red and green lights arranged in rows defining a square, each row thereof consisting of six lights.

7. A method of testing as defined in claim 6 wherein each said complete visual display comprises four illuminated lights in selected cooperating locations and colors.

8. A method of testing as defined in claim 7 wherein said prescribed partial visual display consists of three of said four lights of said complete visual display.

References Cited
UNITED STATES PATENTS

| | | | |
|---|---|---|---|
| 1,953,954 | 4/1934 | Constable | 35—22 X |
| 2,870,549 | 1/1959 | Craine | 35—22 |

WILLIAM H. GRIEB, Primary Examiner

U.S. Cl. X.R.

273—130